July 3, 1956
C. R. PATTERSON ET AL
2,752,945
FLUID CONTROL DEVICE
Filed Feb. 5, 1951
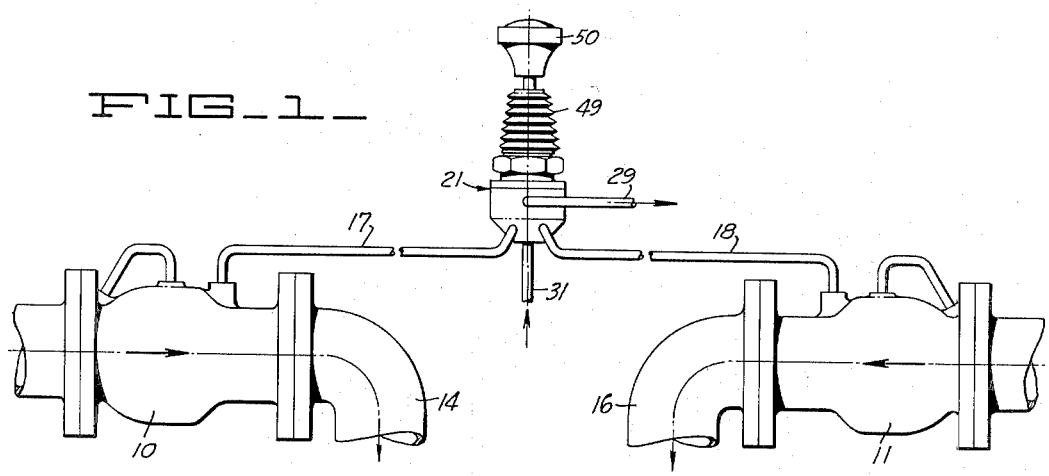
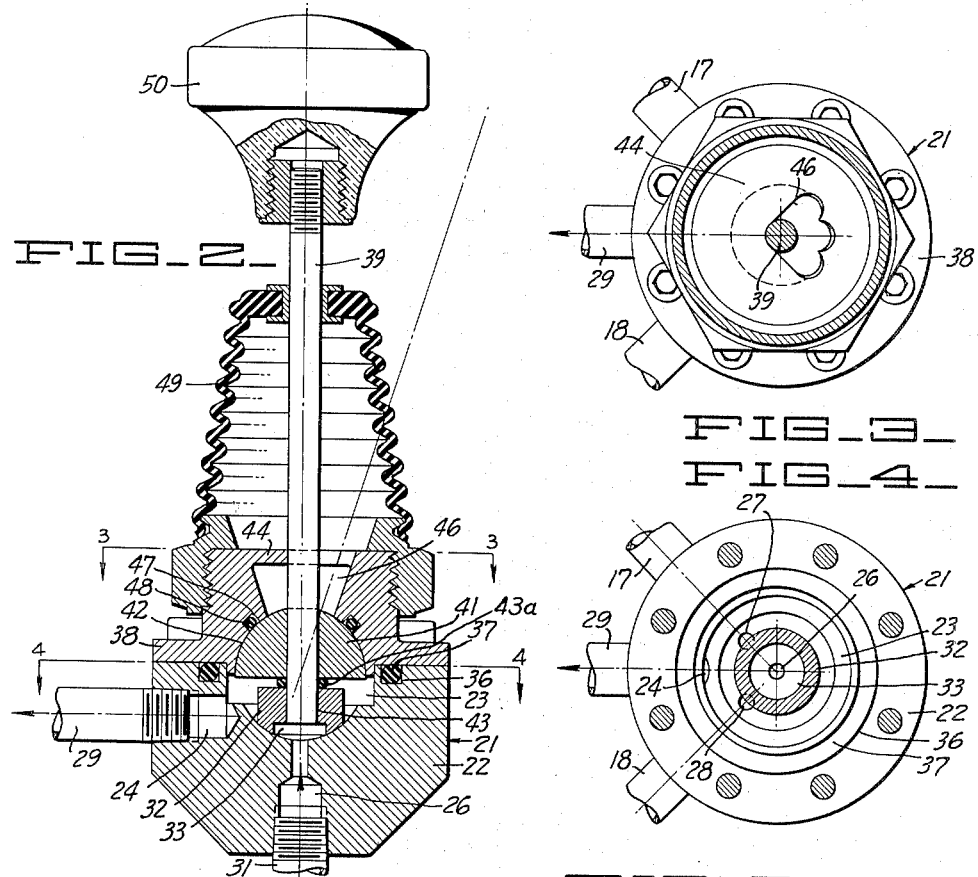
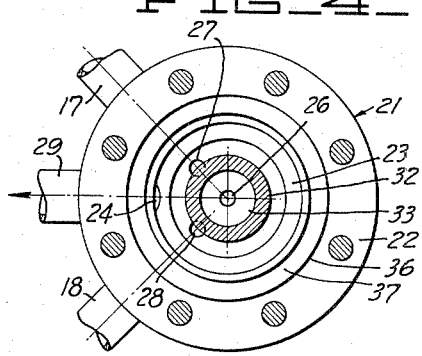
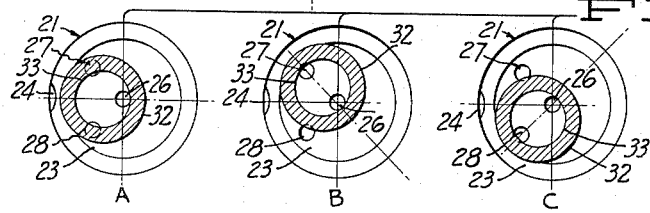
INVENTORS
Francois E. de Bourguignon
BY Clifford R. Patterson
ATTORNEYS

United States Patent Office 2,752,945
Patented July 3, 1956

2,752,945

FLUID CONTROL DEVICE

Clifford R. Patterson and Francois E. de Bourguignon, San Jose, Calif., assignors, by mesne assignments, to Cardox Corporation, Chicago, Ill., a corporation of Illinois Application February 5, 1951, Serial No. 209,504

4 Claims. (Cl. 137—622)

This invention relates to remote control operating devices and particularly to devices of this kind for use in connection with the remote control of hydraulically operated valves for example.

It is an object of this invention to provide a control device which may be used to control a separate device such as a second valve which is adapted to be actuated by fluid under pressure. For example, as disclosed in my copending application Serial No. 209,503, filed February 5, 1951, I disclose a valve adapted to be opened when fluid under pressure from an outside source is supplied thereto and to be closed when that pressure is relieved.

It is another object of this invention to provide a control device for valves of the type disclosed in my said copending application whereby a group of valves may be operated together or singly.

It is a further object of this invention to provide a device of this character which may be easily operated to supply fluid under pressure to one or more remotely controlled valves selectively or to vent one or all of said valves selectively thereby serving to open or close the valves together or separately.

Other objects and advantages of this invention will appear from the following specification taken in conjunction with the accompanying drawings:

Figure 1 is an elevational view of a valve incorporating my invention showing the same as it is used in a fluid control system.

Figure 2 is a cross-sectional detail of the valve shown in Figure 1.

Figure 3 is a cross-sectional detail taken along the line 3—3 of Figure 2.

Figure 4 is a cross-sectional detail taken along the line 4—4 of Figure 2.

Figures 5, A, B and C are schematic views showing the positioning of the valve element to obtain various control relationships.

As illustrated particularly in Figure 1, our valve is adapted to permit remote control of one or two devices which are adapted to be controlled from a remote point by supplying fluid or liquid under pressure thereto or by venting liquid or fluid under pressure therefrom. For example, it may be used to control a pair of valves such as described in my copending application Serial No. 209,503 which are adapted to be connected to sources of liquid under pressure and to control its discharge into suitable piping 14 and 16. The valves 10 and 11 illustrated do not form a part of this invention and it is sufficient to say that they are adapted to be opened when pressure is supplied to them through the conduits 17 and 18 and to close when the pressure within the conduits 17 and 18 is vented to the atmosphere.

Our valve 21 consists of a valve body 22 which is provided with a hemispherical cavity 23. Four fluid passages 24, 26, 27 and 28 lead from the spherical cavity 23 to the exterior of the valve body 22. Each of the passageways 24, 26, 27 and 28 terminate in threaded openings which are adapted to accommodate suitable couplings, etc.

Passageway 24 connects to a conduit 29 which is vented to the atmosphere.

Passageway 26 is in communication with a source of fluid or liquid under pressure through conduit 31. The passageways 27 and 28 are suitably connected to fluid conduits 17 and 18 respectively which are connected to the valves 10 and 11 to operate them.

A valve member 32 is provided which is substantially hemispherical in shape and which is adapted to cooperate with and engage the inner wall of the hemispherical cavity 23 of the valve body 22. The valve member 32 is provided with a circular cavity 33 which, as indicated, is of sufficient size to communicate between the passageways 26, 27 and 28 when the member 32 is in the position illustrated in Figure 5A.

Briefly it might be explained that there are four operating positions of the valve member 32, as illustrated in Figures 4, 5A, 5B and 5C respectively.

In Figure 5A, for example, the passageways 26, 27 and 28 are in communication through cavity 33 while communication between passageway 24 and the cavity 33 is prevented by the valve member 32. It will be obvious, therefore, that when the valve member 32 is in the position illustrated in Figure 5A, pressure entering the valve body through the conduit 31 to the passageway 26 will be communicated to the passageways 27 and 28 and the conduits 17 and 18 respectively. This is the so-called dual actuating position.

When the valve member 32 is in the position illustrated in Figure 5B, however, only the passageways 26 and 27 are in communication through cavity 33 with the result that fluid under pressure will be communicated from the source of fluid under pressure from conduit 31 through passageway 26, cavity 33, and passageway 27 to the conduit 17. However, the conduit 18 will be in communication with the atmosphere through the passageway 28, the interior of cavity 23 and the passageway 24. When the device is in the position illustrated in Figure 5C, the conduit 17 will be in communication with the atmosphere through the passageway 27, cavity 23 and passageway 24, while the conduit 18 will be in communication with a source of fluid under pressure through the passageway 28, cavity 33, and passageway 26.

It will be apparent, therefore, that the fluid under pressure may be supplied to either one or both of the conduits 17 or 18 depending upon the positioning of the valve member 32.

When the device is in the position illustrated in Figure 4, the so-called normal position, both of the conduits 17 and 18 are in communication with the atmosphere. In addition, it will be noted that the cavity 33 in the valve member 32 communicates only with the passageway 26 and that the flow of fluid under pressure through the cavity 26 to any of the passageways 27, 28 and 24, for example, is prevented by the close engagement of the walls of the valve member 32 with the cavity 23. We have found that a thin film of oil enhances the seal.

The valve body 22 is provided with an annular recess 36 which surrounds the cavity 23. The recess 36 is adapted to support an O-ring 37. A suitable cap plate 38 is provided which, in addition to forming a seal for the upper part of the valve body 22, also provides a support for a control lever 39. The lever 39 is provided with a hemispherical body portion 41 which is fixed to the control lever 39 and cooperates with a hemispherical cavity portion 42 in the plate 38 to provide universal movement for the lever 39. Lever 39 slidably and rotatably engages a hole 43 in the valve member 32. An O-ring 43a is mounted on the control lever 39 between the hemispherical body portion 41 and the valve member 32 and serves to continuously urge the valve member 32 into relatively tight contact with the hemispherical concave cavity 23. Sideways movement of the operating lever 39 moves the valve member 32 within the hemispherical cavity 23, with the results previously described in connection with a description of Figures 4, 5A, 5B and 5C hereof. The cap 38 is also provided with a plate 44 which is provided with an opening 46 through which the operating lever 39 passes and which is shaped to provide four limiting positions for the operating lever 39. The operating lever 39 provides four limiting positions for the valve member 32 which are the positions illustrated in Figures 4, 5A, 5B and 5C.

The cap 38 is provided with an annular slot 47 which accommodates an O-ring 48, preventing the passage of fluid between the hemispherical body 41 and the hemispherical surface 42 in the member 38.

The operating lever 39 is provided with a handle 50 and is held in normal position (Fig. 5) by means of a rubber jacket 49 which extends upwardly from the cap 38 to a position on lever 39 immediately below the handle 50. However, the tension of the rubber member 49 may be overcome very easily.

It is apparent from the above construction that axial rotation of the control lever 39 and the valve member 32 will not effect operation of the valve. This is true because rotation of the valve member 32 will not effect registry with the passageways 26, 27 and 28 since the cavity 33 is circular in cross section as shown in Figures 4 and 5.

Operation of the device may briefly be described as follows: Let it be assumed that the valves 10 and 11 are connected to suitable sources of fluid under pressure and to suitable piping into which the fluid may be introduced. Let it further be assumed that the valves 10 and 11 are connected by conduits 17 and 18 to my valve substantially as illustrated in Figure 1. Conduit 29 vents to the atmosphere and conduit 31 leads to a source of fluid or liquid under pressure.

In the event fluid under pressure is to be introduced through the conduits 17 and 18 into each of the valves 10 and 11 simultaneously, the operating lever 39 is moved in such a manner that the valve member 32 occupies the positions illustrated generally in Figure 5A with the result that fluid is introduced through the passageway 26 and the cavity 33 into both of the conduits 17 and 18. The vent to the atmosphere through passage 24 is sealed.

Let it be assumed that fluid under pressure is to be introduced into the valve 10 to open the same and that the valve 11 is to remain or be vented and remain or be closed. In such event the operating lever is moved to a position at which the valve 32 occupies the position illustrated generally in Figure 5B with the result that fluid under pressure is supplied through the passageway 26 and cavity 23 to the conduit 17. In the meantime, however, the conduit 18 communicates with the atmosphere through the passageway 28, cavity 23 and passageway 24.

Operation of the valve to vent the tube 17 and supply fluid under pressure to the valve 11 is accomplished in the same manner by operating the lever 39 in such a manner that the valve member 32 is moved to the position shown in Figure 5C.

We claim:

1. In a fluid control device, a valve body having a concave spherical surface therein, a valve member having a convex spherical surface engaging said concave spherical surface and adapated to be moved sideways over the concave surface, a plurality of passageways including an inlet passageway in said body for the passage of fluid, a circular cavity in said valve member adapted to register with one or more of said passageways, said cavity being symmetrically aligned with the axis of said valve member, and an operating lever rotatably mounted on said valve member for effecting the sideways movement of said valve member to control the flow of fluid from said inlet passageway to the other of said passageways, the operation of said fluid control device being unaffected by axial rotation of said valve member.

2. In a fluid control device, a valve body having a concave spherical surface therein, a valve member having a convex spherical surface adapted to engage said concave spherical surface, a removable cap plate having a concave spherical surface, a control lever extending through said cap plate and connected to said valve member, said valve member being slidably and rotatably mounted on said control lever for movement longitudinally and axially of the control lever, a hemispherical member having a convex spherical surface engaging the concave surface formed in said cap plate and fixed to said control lever, a resilient member between said hemispherical member and said valve member to maintain said valve member in continuous engagement with the concave surface in said valve body, a plurality of passageways including an inlet passageway in said body, and a circular cavity in said valve member adapted to register with one or more of said passageways for the control of fluid through said passageways, said cavity being symmetrically aligned with the axis of the valve member whereby upon axial rotation of said valve member the operation of said fluid control device will be unaffected.

3. In a fluid control device, a valve body having a concave spherical surface therein, a valve member having a convex spherical surface adapted to engage said concave spherical surface, a plurality of passageways including an inlet passageway in said valve body, a circular cavity in said valve member adapted to register with one or more of said passageways for the control of fluid through said passageways, said cavity being symmetrically aligned with the axis of said valve member whereby upon axial rotation of said valve member the operation of said fluid control device will be unaffected, a removable cap plate having a concave spherical surface in registry with the concave surface in said valve body, resilient sealing means mounted between said cap plate and said valve body, a control lever extending through said cap plate and connected to said valve member, said valve member being slidably and rotatably mounted on said control lever for movement longitudinally and axially of the control lever, a hemispherical member having a concave surface adapted to engage the concave surface in said cap plate and fixed to said control lever, sealing means disposed between the cap plate and the hemispherical member, and a resilient O-ring between said hemispherical member and said valve member to maintain said valve member in continuous engagement with the concave surface in said valve body.

4. In a fluid control device, a valve body having a concave spherical surface therein, a valve member having a convex spherical surface adapted to engage said concave spherical surface, an inlet passageway and a pair of fluid outlet pasageways in said valve body, an additional outlet passage in said valve body and opening to the atmosphere, a circular cavity in said valve member and adapted to register with only said inlet passageway or with the inlet passageway and either one or both of the fluid outlet passageways, said circular cavity being in symmetrical alignment with the axis of said valve member whereby upon axial rotation of said valve member the operation of said fluid control device will be unaffected, a removable cap plate having a hemispherical concave surface in registry with the concave surface in said valve body, resilient sealing means mounted between said cap plate and said valve body, a control lever extending through an opening in said cap plate and connected to said valve member, said valve member being slidably and rotatably mounted on said control lever for movement longitudinally and axially of the control lever, a hemispherical member having a spherical convex surface adapted to engage the concave surface in said cap plate and fixed to said control lever, resilient sealing means disposed between the cap plate and said hemispherical member, a resilient O-ring between said hemispherical member and said valve member to maintain said valve member in continuous engagement with the concave surface of said valve body, the opening in said cap plate being provided with four guide slots whereby the control lever can be moved in any one of four limiting positions, in the first limiting position preventing the discharge of any fluid from said valve, in the second limiting position allowing the discharge of fluids from both of said fluid outlet passageways, in a third limiting position allowing the discharge of fluid from only one of said fluid outlet passageways and in the fourth position allowing the discharge of fluid from only the other of said fluid outlet passageways, and means mounted on said control lever for automatically returning said control lever to the first position.

References Cited in the file of this patent

UNITED STATES PATENTS

| | | |
|---|---|---|
| 627,671 | Kelly | June 27, 1899 |
| 957,347 | Kennedy | May 10, 1910 |
| 1,299,586 | Leibing | Apr. 8, 1919 |
| 1,698,961 | Mueller | Jan. 15, 1929 |
| 2,020,286 | Bittle | Nov. 12, 1935 |
| 2,320,011 | Reynolds | May 25, 1943 |
| 2,350,662 | Adams | June 6, 1944 |
| 2,478,702 | Moody | Aug. 9, 1949 |